United States Patent
Kwapis et al.

(10) Patent No.: US 9,228,516 B2
(45) Date of Patent: Jan. 5, 2016

(54) FUEL PUMP PRIME ACTIVATED BY DOOR SENSOR

(75) Inventors: Dean R. Kwapis, White Lake, MI (US);
Rafat F. Hattar, Royal Oak, MI (US);
Maher El-Jaroudi, Canton, MI (US);
Timothy J. Braman, Williamston, MI (US)

(73) Assignee: GM Global Technology Operations LLC, Detroit, MI (US)

(*) Notice: Subject to any disclaimer, the term of this patent is extended or adjusted under 35 U.S.C. 154(b) by 546 days.

(21) Appl. No.: 13/602,628

(22) Filed: Sep. 4, 2012

(65) Prior Publication Data
US 2014/0067242 A1    Mar. 6, 2014

(51) Int. Cl.
| | |
|---|---|
| *F02D 41/06* | (2006.01) |
| *F02M 37/20* | (2006.01) |
| *F02D 41/38* | (2006.01) |
| *F02D 33/00* | (2006.01) |
| *F02D 41/30* | (2006.01) |
| *F02D 13/02* | (2006.01) |
| *F02B 75/12* | (2006.01) |

(52) U.S. Cl.
CPC ............ F02D 41/062 (2013.01); F02D 33/006 (2013.01); F02D 41/3854 (2013.01); F02M 37/20 (2013.01); *F02B 2075/125* (2013.01); *F02D 13/0207* (2013.01); *F02D 41/3082* (2013.01); *F02D 2200/50* (2013.01); *Y02T 10/123* (2013.01)

(58) Field of Classification Search
CPC ............ F02D 2041/225; F02D 33/003; F02D 19/021; F02D 19/025; F02D 19/026
USPC ............... 701/103, 104, 112, 123, 124, 33.6, 701/33.9, 114; 123/198 D, 198 DB, 459, 123/179.9, 179.12, 463, 464, 465, 527, 529, 123/494
See application file for complete search history.

(56) References Cited

U.S. PATENT DOCUMENTS

| | | | |
|---|---|---|---|
| 4,617,116 A | 10/1986 | Seiler | |
| 4,683,864 A | 8/1987 | Bucci | |
| 4,748,943 A * | 6/1988 | Mayer | 123/41.15 |
| 5,572,964 A * | 11/1996 | Cogneville et al. | 123/179.17 |
| 5,664,532 A * | 9/1997 | August | 123/179.11 |
| 6,073,597 A * | 6/2000 | Harata et al. | 123/179.14 |
| 6,371,736 B1 * | 4/2002 | Froeschl et al. | 417/279 |
| 6,390,075 B1 * | 5/2002 | Yamazaki et al. | 123/529 |
| 6,588,449 B1 | 7/2003 | Kippe | |
| 6,688,288 B1 * | 2/2004 | Houston et al. | 123/456 |
| 6,830,026 B2 * | 12/2004 | Agricola et al. | 123/198 D |
| 6,918,367 B2 * | 7/2005 | Denz et al. | 123/179.17 |
| 7,021,261 B2 * | 4/2006 | Joos et al. | 123/179.17 |
| 7,093,576 B2 * | 8/2006 | DeRaad | 123/179.17 |
| 7,970,528 B2 * | 6/2011 | Janarthanam et al. | 701/114 |
| 8,347,867 B2 | 1/2013 | Zumbaugh et al. | |

(Continued)

FOREIGN PATENT DOCUMENTS

| | | | | |
|---|---|---|---|---|
| DE | 19805072 A1 | 8/1999 | | |
| JP | 06173806 A * | 6/1994 | | F02M 37/08 |

*Primary Examiner* — Hieu T Vo
*Assistant Examiner* — Sherman Manley

(57) ABSTRACT

An engine control system includes a fuel system including a first fuel pump in fluid communication with a fuel tank and a second fuel pump in fluid communication with the first fuel pump. A pump control module selectively turns on the first fuel pump when a door opens before an engine is started, the engine is not cranking and a rail pressure of the first fuel pump is less than a predetermined rail pressure.

11 Claims, 3 Drawing Sheets

(56) References Cited

U.S. PATENT DOCUMENTS

| | | | |
|---|---|---|---|
| 2009/0250038 A1* | 10/2009 | Xu et al. | 123/457 |
| 2010/0095935 A1* | 4/2010 | Verner et al. | 123/456 |
| 2011/0186012 A1* | 8/2011 | Wong et al. | 123/445 |
| 2013/0238226 A1* | 9/2013 | Slaymaker et al. | 701/113 |
| 2014/0067242 A1* | 3/2014 | Kwapis et al. | 701/113 |

* cited by examiner

FUEL PUMP PRIME ACTIVATED BY DOOR SENSOR

FIELD

The present disclosure relates to engine control systems, and more specifically to engine control systems that automatically prime a pump before engine cranking to improve engine starting.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Spark ignition, direct injection (SIDI) engines tend to have longer engine starting times and engine start time variation. The engine starting problems arise due to variations in the amount of time required to prime a low pressure fuel pump.

SUMMARY

An engine control system includes a fuel system including a first fuel pump in fluid communication with a fuel tank and a second fuel pump in fluid communication with the first fuel pump. A pump control module selectively turns on the first fuel pump when a door opens before an engine is started, the engine is not cranking and a rail pressure of the first fuel pump is less than a predetermined rail pressure.

In other features, the engine is a spark ignition, direct injection (SIDI) engine. The pump control module selectively turns on the first fuel pump for a predetermined period. The predetermined period is in a range from 1-3 seconds. The pump control module includes a pressure comparing module that compares the rail pressure to the predetermined rail pressure and a prime actuator module that communicates with the pressure comparing module, that receives an engine off signal, a door open signal, and an engine cranking signal, and that primes the first fuel pump for the predetermined period based on the engine off signal, the door open signal, the cranking signal and an output of the pressure comparing module.

In other features, a hood switch disable module selectively disables priming the first fuel pump by the pump control module when a hood of a vehicle is open before the engine is started.

A method includes providing fuel to an engine using a first fuel pump in fluid communication with a fuel tank and a second fuel pump in fluid communication with the first fuel pump; and selectively turning on the first fuel pump when a door opens before the engine is started, the engine is not cranking and a rail pressure of the first fuel pump is less than a predetermined pressure.

In other features, the engine is a spark ignition, direct injection (SIDI) engine. The method includes selectively turning on the first fuel pump for a predetermined period. The predetermined period is in a range from 1-3 seconds. The method includes disabling priming the first fuel pump before the engine is started when a hood of a vehicle is open.

A pump control system includes a pressure comparing module that compares a rail pressure associated with a first fuel pump to a predetermined pressure. A prime actuator module communicates with the pressure comparing module, receives an engine off signal, a door open signal, and a cranking signal, and selectively primes the first fuel pump for a predetermined period in response to the door open signal before an engine is started when the cranking signal indicates that the engine is not cranking and the rail pressure of the first fuel pump is less than the predetermined pressure.

In other features, the engine is a spark ignition, direct injection (SIDI) engine. The predetermined period is in a range from 1-3 seconds. A hood switch disable module selectively disables turning on the first fuel pump before starting when a hood of a vehicle is opened before the engine is started.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Spark ignition, direct injection (SIDI) engines tend to have longer engine starting times and engine start time variation, which can lead to customer complaints. Starting problems may arise due to variations in the amount of time required to prime a low pressure (LP) fuel pump. In some instances, a vapor bubble forms in a fuel line during a soak period. The vapor bubble increases a time period that is required to build fuel pressure for SIDI engines. The increased period to build fuel pressure tends to cause longer start times, since many engine control systems delay fuel injection until a target rail pressure is achieved.

Systems and methods according to the present disclosure automatically prime the LP fuel pump (without driver interaction) for a predetermined period prior to engaging a starter to improve engine start time and engine start time variation. The systems and methods according to the present disclosure compress the vapor bubble prior to engine cranking. For example only, the systems and methods according to the present disclosure sense a door open event when the engine is off and not cranking and automatically prime the LP fuel pump prior to engine cranking to reduce engine start time and engine start variation.

Figure 1:
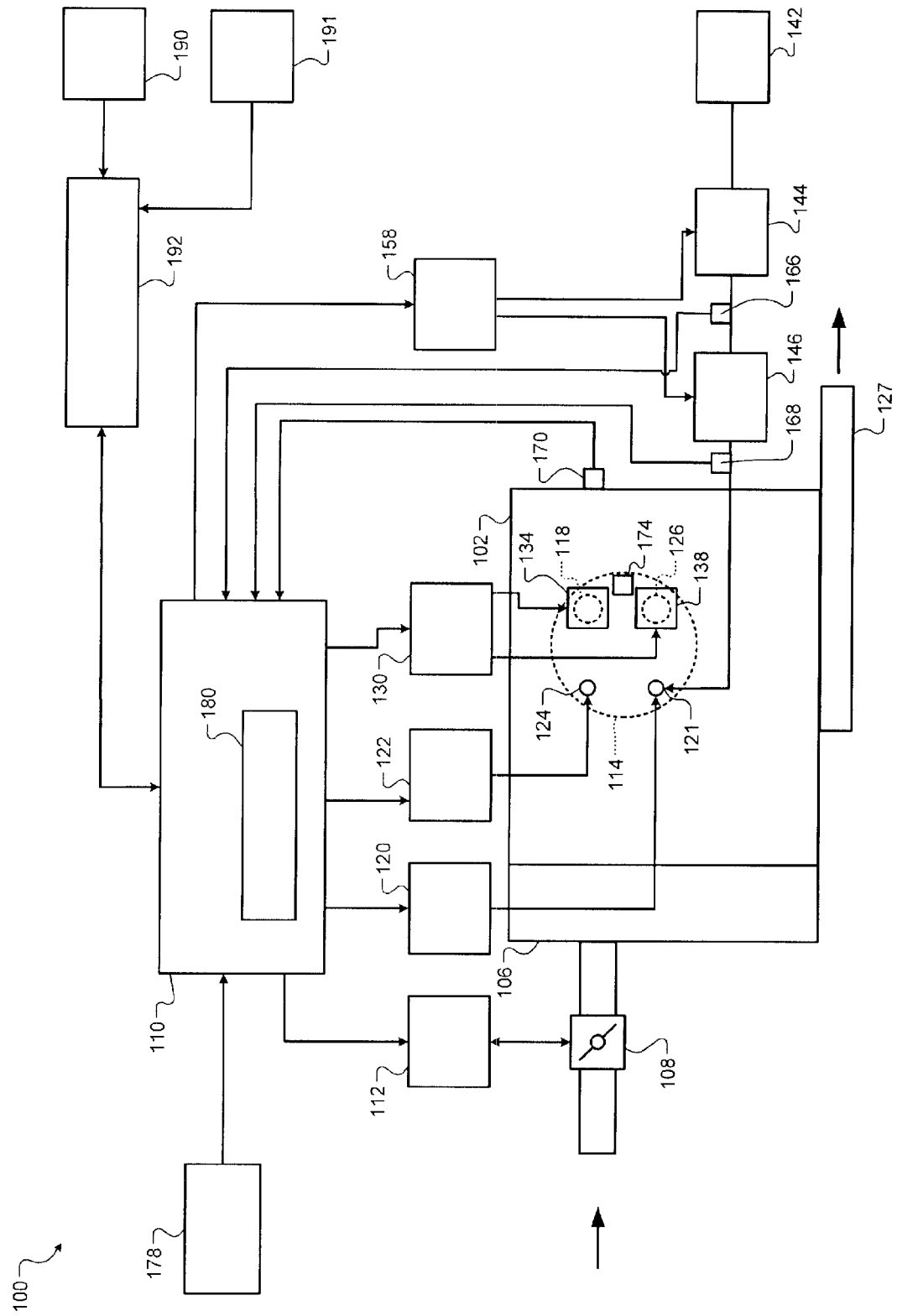
FIG. 1 is a functional block diagram of an engine system including an engine control module, a low pressure (LP) pump and a high pressure (HP) pump according to the present disclosure.

Referring now to FIG. 1, a functional block diagram of an example engine system 100 is presented. The engine system 100 includes an engine 102 that combusts an air/fuel mixture to produce drive torque for a vehicle. While the engine 102 will be discussed as a spark ignition, direct injection (SIDI) engine, the engine 102 may include another suitable type of engine, such as a compression ignition engine. One or more electric motors and/or motor generator units (MGUs) may be provided with the engine 102.

Air is drawn into an intake manifold 106 through a throttle valve 108. The throttle valve 108 may vary airflow into the intake manifold 106. For example only, the throttle valve 108 may include a butterfly valve having a rotatable blade. An engine control module 110 controls a throttle actuator module 112 (e.g., an electronic throttle controller or ETC), and the throttle actuator module 112 controls opening of the throttle valve 108.

Air from the intake manifold 106 is drawn into cylinders of the engine 102. While the engine 102 may include more than one cylinder, only a single representative cylinder 114 is shown. Air from the intake manifold 106 is drawn into the cylinder 114 through an intake valve 118. One or more intake valves may be provided with each cylinder.

The engine control module 110 controls a fuel actuator module 120, and the fuel actuator module 120 controls fuel injection (e.g., amount and timing) by a fuel injector 121. The engine control module 110 may control fuel injection to achieve a desired air/fuel ratio, such as a stoichiometric air/fuel ratio. While fuel is shown and discussed as being injected directly into the cylinder 114, fuel may be injected at other locations in other types of engines, such as into the intake manifold 106 near the intake valves of the cylinders or into mixing chambers associated with the cylinders. A fuel injector may be provided for each cylinder.

The injected fuel mixes with air and creates an air/fuel mixture in the cylinder 114. Based upon a signal from the engine control module 110, a spark actuator module 122 may energize a spark plug 124 in the cylinder 114. A spark plug may be provided for each cylinder. Spark generated by the spark plug 124 ignites the air/fuel mixture. Heat generated by compression causes ignition in compression ignition engines and during operation of an engine in a compression ignition (e.g., homogeneous charge compression ignition) mode.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 114. Therefore, two revolutions crankshaft are necessary for the cylinders to experience all four of the strokes.

During the intake stroke, air from the intake manifold 106 is drawn into the cylinder 114 through the intake valve 118. Injected fuel mixes with air and creates an air/fuel mixture in the cylinder 114. During the compression stroke, a piston (not shown) within the cylinder 114 compresses the air/fuel mixture. During the combustion stroke, combustion of the air/fuel mixture drives the piston, thereby driving the crankshaft. During the exhaust stroke, the byproducts of combustion are expelled through an exhaust valve 126 to an exhaust system 127.

A valve actuator module 130 controls opening and closing of the intake valves and the exhaust valves of the engine 102 based on signals from the engine control module 110. More specifically, an intake valve actuator 134 controls actuation (opening, closing, and lift) of the intake valve 118. An exhaust valve actuator 138 controls actuation (opening, closing, and lift) of the exhaust valve 126. The valve actuator module 130 controls the intake and exhaust valve actuators 134 and 138 based on signals from the engine control module 110.

A LP fuel pump 142 provides fuel from a fuel tank 140 at a first rail pressure. A high pressure (HP) fuel pump 144 receives fuel from the LP fuel pump 142 and provides fuel at a second rail pressure that is greater than the first rail pressure. A pump actuator 158 may be used to control the LP fuel pump 142 and the HP fuel pump 144. Alternately, the LP fuel pump 142 and the HP fuel pump 144 may be controlled directly by the engine control module. A first pressure sensor 166 senses the first rail pressure at an output of the LP fuel pump 144. A second pressure sensor 168 senses the second rail pressure at an output of the HP fuel pump 146.

A crankshaft position sensor 170 monitors rotation of the crankshaft and generates a crankshaft position signal based on rotation of the crankshaft. For example only, the crankshaft position sensor 170 may include a variable reluctance (VR) sensor or another suitable type of crankshaft position sensor.

The crankshaft position sensor 170 may generate pulses in the crankshaft position signal as teeth of a toothed wheel pass the crankshaft position sensor 170. The toothed wheel rotates with the crankshaft. Each pulse corresponds to an angular rotation of the crankshaft by an amount approximately equal to 360° divided by the number of teeth of the toothed wheel. The toothed wheel may also include a gap of one or more missing teeth, and the gap may be used as an indicator of one complete revolution of the crankshaft (i.e., 360° of crankshaft rotation). A cylinder pressure sensor (not shown) may be provided to measure pressure within the cylinder 114 and to generate a cylinder pressure signal based on the pressure. A cylinder pressure sensor may be provided for each cylinder of the engine. In some examples, the pressure within the cylinder 114 (cylinder pressure) may be estimated (determined) based on one or more other parameters.

One or more other sensors 178 may also be implemented. For example, the other sensors 178 may include a mass air flowrate (MAF) sensor, a manifold absolute pressure (MAP) sensor, an intake air temperature (IAT) sensor, a coolant temperature sensor, an oil temperature sensor, and/or one or more other suitable sensors.

The engine control module 110 includes a LP pump control module 180 that automatically controls the LP fuel pump 144 to reduce engine start time and engine start time variation. In some implementations, a door sensor 190 senses opening of a vehicle door (a door open event) and communicates with a vehicle control module 192 or directly with the engine control module 110. A hood switch 192 senses opening of the hood of the vehicle. For example only, the vehicle controller 192 communicates with the engine control module 110 via a controller area network (CAN) bus.

Figure 2:
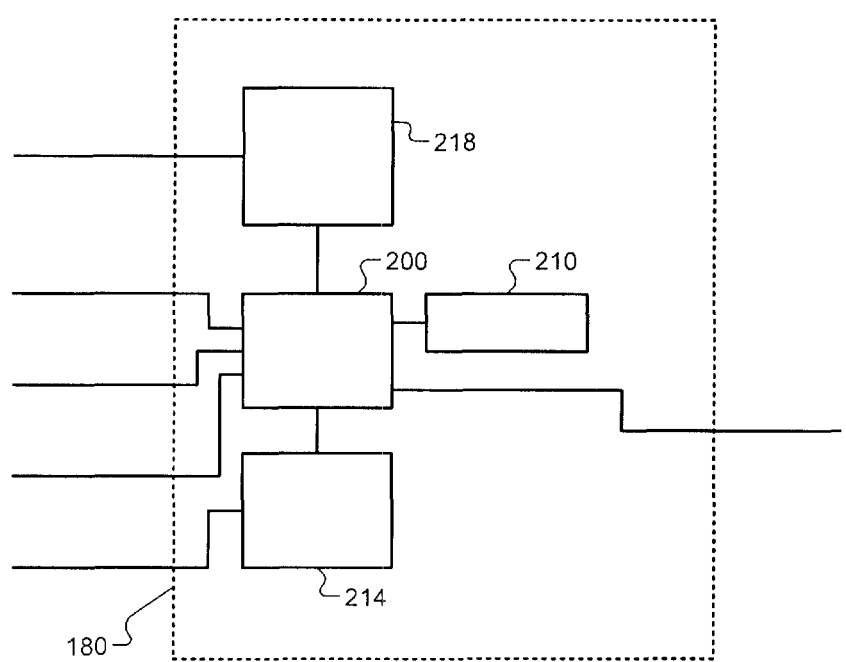
FIG. 2 is a functional block diagram of a LP prime control module according to the present disclosure.

Referring now to FIG. 2, an example of the LP pump control module 180 is shown in further detail. The LP pump control module 180 includes a prime actuator module 200, a timer 210, and a pressure comparing module 214. The prime actuator module 200 receives engine off, door open, and engine cranking signals. The pressure comparing module 214 receives a rail pressure signal from the LP fuel pump 144. When the engine is off and the door sensor 190 senses the door is opened, the prime actuator module 200 turns on the LP fuel pump for a predetermined period determined by the timer 210 if there is no engine cranking and the pressure comparing module determines that the rail pressure is less than a predetermined rail pressure limit. In some examples, the period set by the timer may be in the range of 1-3 seconds, although other periods may be used. A hood open disabling module 218 receives a hood open signal and selectively disables the prime actuator module 200 when the hood is open before starting when the door open signal is received.

Figure 3:
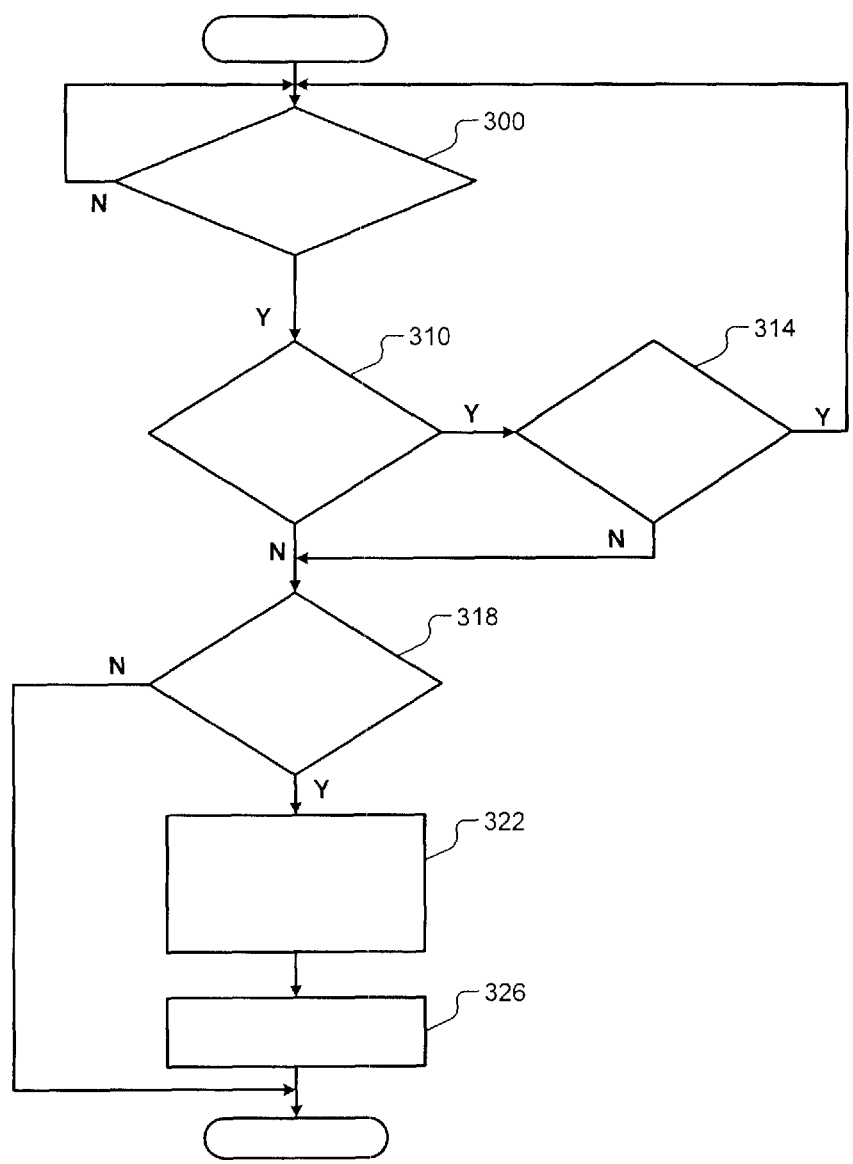
FIG. 3 is a flowchart illustrating operation of the LP prime control module according to the present disclosure.

Referring now to FIG. 3, an example of a method for automatically priming a LP pump is shown. At 300, control detects whether the vehicle door is open and the engine is not started. If false, control returns to 300. If 300 is true, control determines whether a hood switch check is enabled at 310. If 310 is true, control determines whether the hood is open at 314. If 314 is true, control returns to 300. If 314 is false or the hood switch check is disabled at 310, control continues with 318. At 318, control determines whether there is no cranking and rail pressure is less than a predetermined rail pressure limit. If 318 is true, control continues at 322 and turns on the LP fuel pump for a predetermined period. At 326, control turns off the fuel pump after the predetermined period and control ends. If 318 is false, control ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. An engine control system, comprising:
   a fuel system including:
      a first fuel pump in fluid communication with a fuel tank; and
      a second fuel pump in fluid communication with the first fuel pump; and
   a pump control module that selectively turns on the first fuel pump when a door opens before an engine is started, the engine is not cranking and a rail pressure of the first fuel pump is less than a predetermined rail pressure.

2. The engine control system of claim 1, wherein the engine is a spark ignition, direct injection (SIDI) engine.

3. The engine control system of claim 1, wherein the pump control module selectively turns on the first fuel pump for a predetermined period.

4. The engine control system of claim 3, wherein the predetermined period is in a range from 1-3 seconds.

5. The engine control system of claim 3, wherein the pump control module includes:
   a pressure comparing module that compares the rail pressure to the predetermined rail pressure; and
   a prime actuator module that communicates with the pressure comparing module, that receives an engine off signal, a door open signal, and an engine cranking signal, and that primes the first fuel pump for the predetermined period based on the engine off signal, the door open signal, the engine cranking signal and an output of the pressure comparing module.

6. The engine control system of claim 1, further comprising a hood switch disable module that selectively disables priming the first fuel pump by the pump control module when a hood of a vehicle is open before the engine is started.

7. A method comprising:
   providing fuel to an engine using a first fuel pump in fluid communication with a fuel tank and a second fuel pump in fluid communication with the first fuel pump; and
   selectively turning on the first fuel pump when a door opens before the engine is started, the engine is not cranking and a rail pressure of the first fuel pump is less than a predetermined pressure.

8. The method of claim 7, wherein the engine is a spark ignition, direct injection (SIDI) engine.

9. The method of claim 7, further comprising selectively turning on the first fuel pump for a predetermined period.

10. The method of claim 9, wherein the predetermined period is in a range from 1-3 seconds.

11. The method of claim 7, further comprising disabling priming the first fuel pump before the engine is started when a hood of a vehicle including the engine is open.

* * * * *